(12) United States Patent
Takamoto

(10) Patent No.: US 8,269,863 B2
(45) Date of Patent: Sep. 18, 2012

(54) SOLID-STATE IMAGE PICKUP DEVICE AND IMAGE PICKUP APPARATUS

(75) Inventor: Masaru Takamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 11/876,905

(22) Filed: Oct. 23, 2007

(65) Prior Publication Data

US 2008/0094489 A1    Apr. 24, 2008

(30) Foreign Application Priority Data

Oct. 24, 2006   (JP) .................................. 2006-288689

(51) Int. Cl.
*H04N 9/64* (2006.01)
(52) U.S. Cl. ...................................................... 348/243
(58) Field of Classification Search .................... 348/243
See application file for complete search history.

(56) References Cited

U.S. PATENT DOCUMENTS

| | | | | |
|---|---|---|---|---|
| 5,532,758 A | * | 7/1996 | Honma | 348/694 |
| 6,005,615 A | * | 12/1999 | Tsuda | 348/243 |
| 6,100,928 A | * | 8/2000 | Hata | 348/229.1 |
| 7,633,536 B2 | * | 12/2009 | Suwa | 348/245 |
| 2005/0052555 A1 | * | 3/2005 | Shirakawa | 348/302 |

FOREIGN PATENT DOCUMENTS

| | | |
|---|---|---|
| JP | 64-037179 | 2/1989 |
| JP | 02-054683 | 2/1990 |
| JP | 07-221980 | 8/1995 |
| JP | 09-205587 | 8/1997 |
| JP | 10-174002 | 6/1998 |
| JP | 2000-156822 | 6/2000 |
| JP | 2001-189892 | 7/2001 |
| JP | 2002-152597 | 5/2002 |
| JP | 2003-298953 | 10/2003 |
| JP | 2004-129000 | 4/2004 |
| JP | 2004-236180 | 8/2004 |
| JP | 2005-080263 | 3/2005 |
| JP | 2005-311919 | 11/2005 |
| JP | 2006-086971 | 3/2006 |

OTHER PUBLICATIONS

Japanese Patent Office Action corresponding to Japanese Serial No. 2006-288689 dated Jul. 7, 2006.
Japanese Patent Office Action corresponding to Japanese Serial No. 2006-288689 dated Apr. 6, 2010.

* cited by examiner

*Primary Examiner* — Anthony J Daniels
(74) *Attorney, Agent, or Firm* — SNR Denton US LLP

(57) ABSTRACT

A solid-state image pickup device includes a pixel array including a plurality of pixels, each having a photoelectric converter; a signal conversion circuit converting a pixel signal from the pixel array into an output signal; and a clamp correction circuit correcting a clamp level included in a predetermined signal dealt with by the signal conversion circuit. The clamp correction circuit includes an analog-to-digital converter performing analog-to-digital conversion of the predetermined signal and generating and outputting N+M bits of digital data at the time of analog-to-digital conversion, N+M bits being obtained by adding M bits for correction to N bits assigned to the predetermined signal; a correction-value generating unit determining a correction value based on the N+M bits of digital data and a target value; and a computing unit performing a correction computation using the N+M bits of digital data and the correction value to generate N bits of clamp-corrected data.

6 Claims, 6 Drawing Sheets

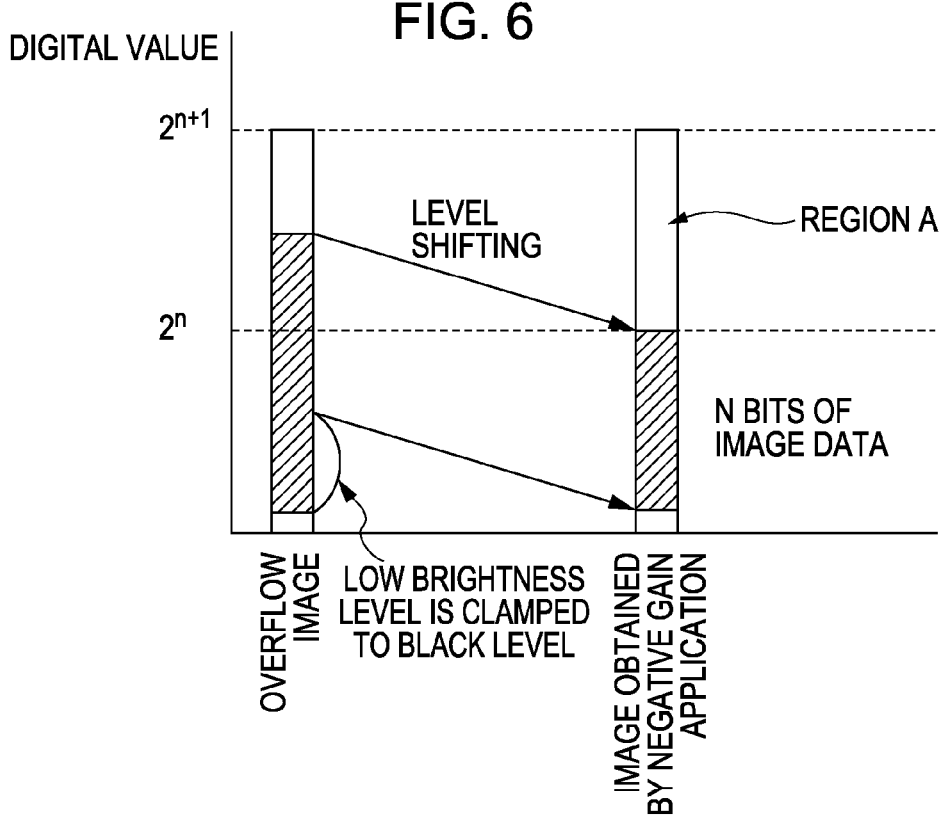
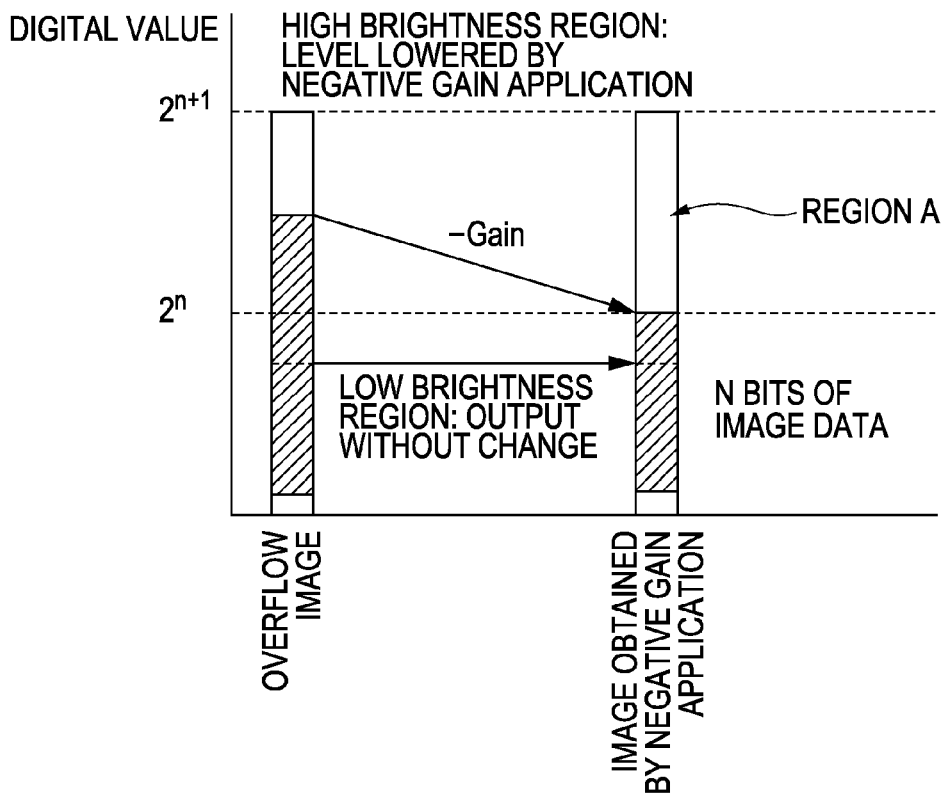

SOLID-STATE IMAGE PICKUP DEVICE AND IMAGE PICKUP APPARATUS

CROSS REFERENCES TO RELATED APPLICATIONS

The present invention contains subject matter related to Japanese Patent Application JP 2006-288689 filed in the Japanese Patent Office on Oct. 24, 2006, the entire contents of which are incorporated herein by reference.

BACKGROUND OF THE INVENTION

1. Field of the Invention

The present invention relates to a solid-state image pickup device and an image pickup apparatus that convert an analog image signal into digital image data and output the digital image data.

2. Description of the Related Art

As a solid-state image pickup device for use in an image pickup apparatus, there has been provided a complementary metal oxide semiconductor (CMOS) image sensor. A CMOS image sensor includes, for example, a photodiode that performs photoelectric conversion for each of a plurality of pixels constituting a pixel array unit, a read-out transistor that reads out signal charges generated by the photodiode, an amplification transistor that converts the read-out signal charges into a pixel signal, a reset transistor that resets signal charges, and a selection transistor that selects a pixel to be read out. A known CMOS image sensor of this type has a peripheral circuit capable of performing various processing on an image signal output from a pixel array unit and converts, in the solid-state image pickup device, the processed image signal into digital image data to output the digital image data.

There have also been provided various image pickup apparatuses, such as camera apparatuses, in which even if a solid-state image pickup device does not have a digitizing function, an analog image signal output from the solid-state image pickup device is digitized by an external circuit, subjected to various digital processing, and output. In this case, various analog-output-type CMOS image sensors and charge-coupled device (CCD) image sensors can be used as the solid-state image pickup device. Also, there has been provided an image pickup apparatus that includes a sensor module serving as an intermediate module between an image sensor and a camera apparatus. The sensor module is provided as a package including a CMOS image sensor or CCD image sensor and an external circuit.

For solid-state image pickup devices of the types described above, it is necessary to be capable of removing dark current. To deal with variations in dark current among devices and fluctuations in dark current that occur during an image pickup operation, there are provided various methods in which, for example, a black reference signal detected from light-shielding pixels (or an optical black (OB) area) provided in part of a pixel array unit is properly corrected and clamped to a target value.

For example, there is proposed a configuration in which an analog black reference signal included in an input signal is detected and compared with a target value, an error signal is calculated from the result of the comparison, feedback is applied to the error signal, the input signal is corrected with the error signal, and an appropriate correction value is calculated by digital computation (see, e.g., Japanese Unexamined Patent Application Publications Nos. 10-276976 and 2005-80263).

There is also proposed a configuration in which processing similar to that described above is achieved without performing feedback of an analog signal, and is achieved only by performing a clamp correction of a digital signal. Thus, a circuit is simplified (see, e.g., Japanese Unexamined Patent Application Publications Nos. 10-174002 and 2004-129000).

SUMMARY OF THE INVENTION

However, there are problems in the above-described conventional technique which combines correction made by feedback of an analog signal with correction made by digital computation. A problem is that providing a circuit for correction of an analog signal causes an increase in circuit size. Another problem is that an increase in the number of noise paths often causes degradation in the quality of the original signal. In particular, for a solid-state image pickup device, which is expected to provide various functions on a small chip, the increase in circuit size will sacrifice the mounting of other functions and thus is undesirable.

There are problems also in the above-described conventional technique in which similar processing is achieved without using a feedback circuit for an analog signal and is achieved only by performing a clamp correction of a digital signal. A problem is that since only digital clamp is performed in a solid-state image pickup device, which suffers large fluctuations in dark current, a dynamic range for correction is narrow. Additionally, application of analog gain control to an image signal causes an optical black value to be also amplified. This means that the correction capability of digital processing alone is limited.

The above-described problems occur not only in correcting a black reference signal, but also in correcting various signals (e.g., a no-filter pixel signal and a detection signal of light of a specific wavelength) included in a pixel signal.

Accordingly, it is desirable to provide a solid-state image pickup device and an image pickup apparatus that are fully capable of correcting a predetermined signal included in a pixel signal without using an analog feedback circuit.

According to an embodiment of the present invention, there is provided a solid-state image pickup device including a pixel array unit having a plurality of pixels, each pixel having a photoelectric converter; a signal conversion circuit configured to convert a pixel signal output from the pixel array unit into an output signal; and a clamp correction circuit configured to correct a clamp level included in a predetermined signal dealt with by the signal conversion circuit. The clamp correction circuit includes an analog-to-digital converter that performs analog-to-digital conversion of the predetermined signal and generates and outputs N+M bits of digital data at the time of the analog-to-digital conversion, N+M bits being obtained by adding M bits for correction to N bits assigned to the predetermined signal; a correction value generating unit that determines a correction value on the basis of the N+M bits of digital data output by the analog-to-digital converter and a target value; and a computing unit that performs a correction computation using the N+M bits of digital data output by the analog-to-digital converter and the correction value output by the correction value generating unit so as to generate N bits of clamp-corrected data.

According to another embodiment of the present invention, there is provided an image pickup apparatus including a solid-state image pickup device configured to pick up an image of a subject; an image pickup optical system configured to form a subject image on a photo-detector of the solid-state image pickup device; a drive controller configured to drive the image pickup optical system; a signal processor configured to perform signal processing on an output signal from the solid-state image pickup device so as to generate an image pickup signal; a recording unit configured to record the image pickup signal generated by the signal processor; an output unit configured to output the image pickup signal generated by the signal processor; and an operation unit configured to input various signals for controlling an image pickup operation. The solid-state image pickup device includes a pixel array unit including a plurality of pixels, each pixel having a photoelectric converter; a signal conversion circuit configured to convert a pixel signal output from the pixel array unit into an output signal; and a clamp correction circuit configured to correct a clamp level included in a predetermined signal dealt with by the signal conversion circuit. The clamp correction circuit includes an analog-to-digital converter that performs analog-to-digital conversion of the predetermined signal and generates and outputs N+M bits of digital data at the time of the analog-to-digital conversion, N+M bits being obtained by adding M bits for correction to N bits assigned to the predetermined signal; a correction value generating unit that determines a correction value on the basis of the N+M bits of digital data output by the analog-to-digital converter and a target value; and a computing unit that performs a correction computation using the N+M bits of digital data output by the analog-to-digital converter and the correction value output by the correction value generating unit so as to generate N bits of clamp-corrected data.

In the solid-state image pickup device and image pickup apparatus according to the embodiments of the present invention, the clamp correction circuit is a digital circuit that generates N+M bits of digital data at the time of analog-to-digital conversion of a signal on which a clamp correction is to be performed, N+M bits being obtained by adding M bits for correction to N bits originally assigned to this signal; determines a correction value on the basis of the N+M bits of digital data and a target value; and performs a correction computation to generate N bits of clamp-corrected data. Since an appropriate clamp correction can thus be performed without using an analog feedback circuit, it is possible to realize a compact circuit and prevent an increase in noise caused by the presence of an analog circuit.

Moreover, since M bits for correction are added at the time of A/D conversion, it is possible to prevent reduction of a dynamic range caused by digital clamp and thus to fully perform a clamp correction.

BRIEF DESCRIPTION OF THE DRAWINGS

FIG. 6 illustrates a state of an image signal in the clamp correction circuit of FIG. 3 in operation example 2.

FIG. 7 illustrates a state of an image signal in the clamp correction circuit of FIG. 3 in operation example 3.

DESCRIPTION OF THE PREFERRED EMBODIMENTS

Figure 1:
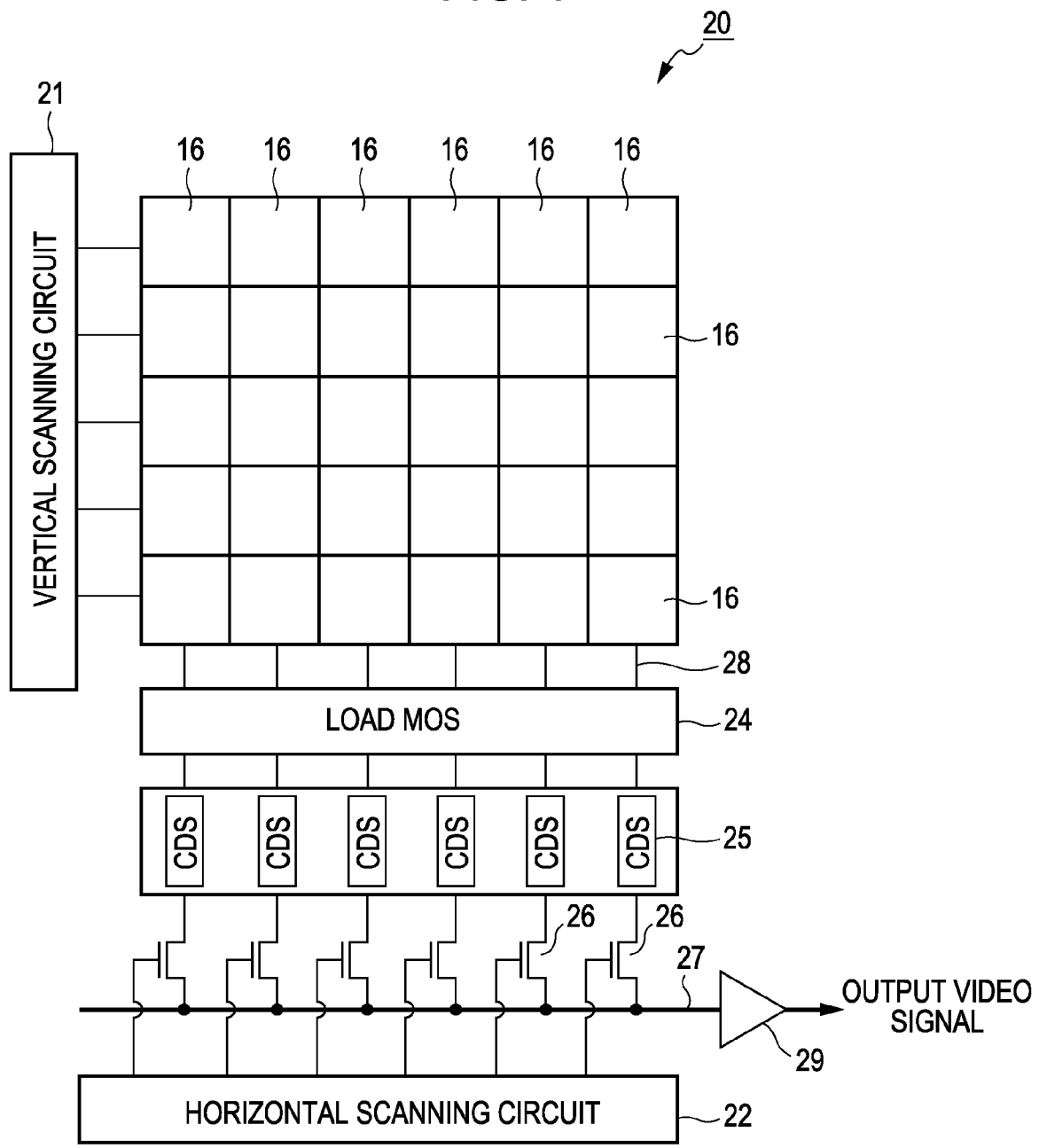
FIG. 1 is a plan view illustrating an exemplary configuration of a solid-state image pickup device according to an embodiment of the present invention.
Figure 2:
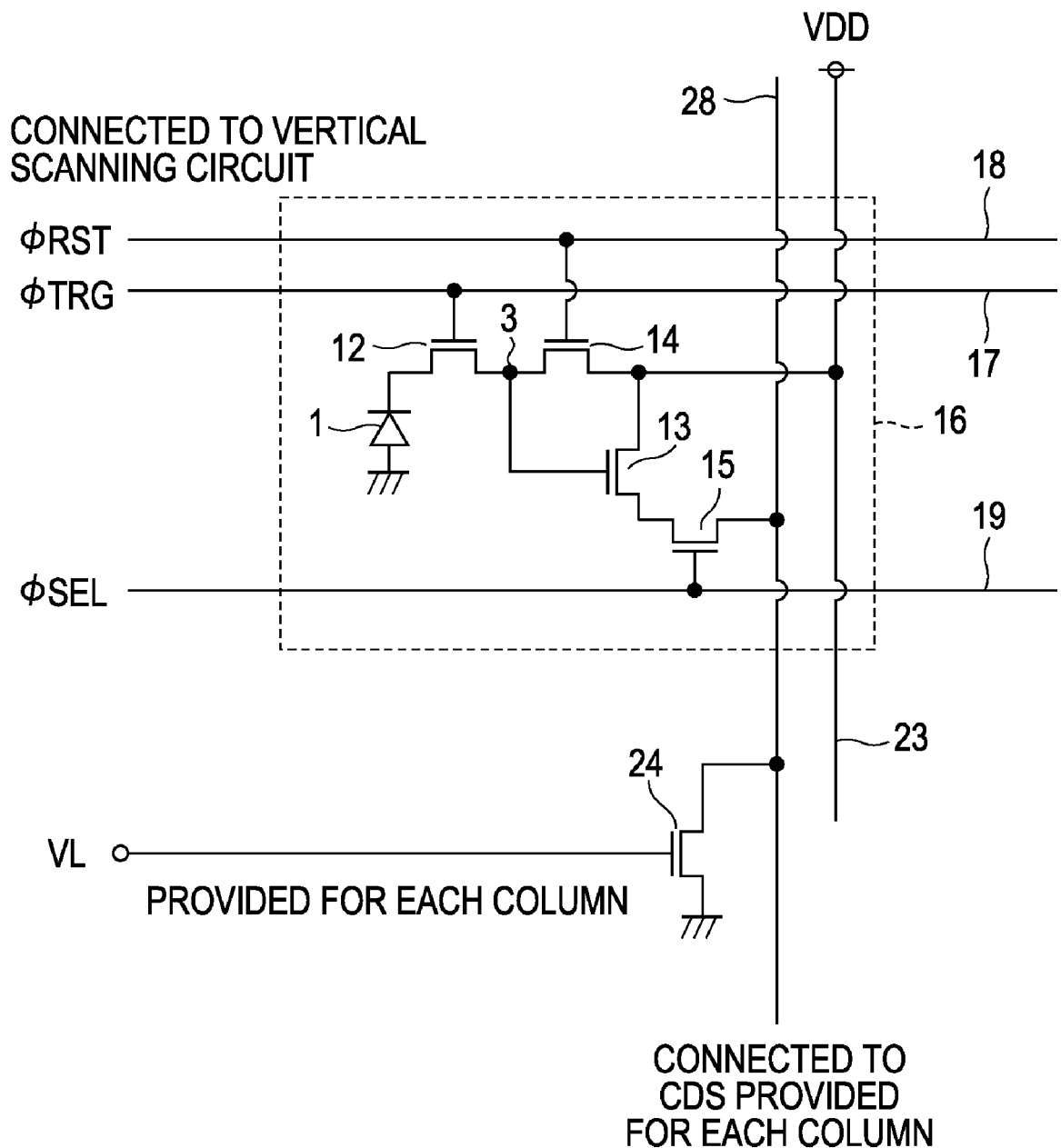
FIG. 2 is a circuit diagram illustrating a configuration of a pixel circuit in the solid-state image pickup device of FIG. 1.

FIG. 1 is a plan view illustrating a CMOS image sensor as an example of a solid-state image pickup device according to an embodiment of the present invention. FIG. 2 is a circuit diagram illustrating a circuit configuration in a pixel of the solid-state image pickup device illustrated in FIG. 1.

Figure 3:
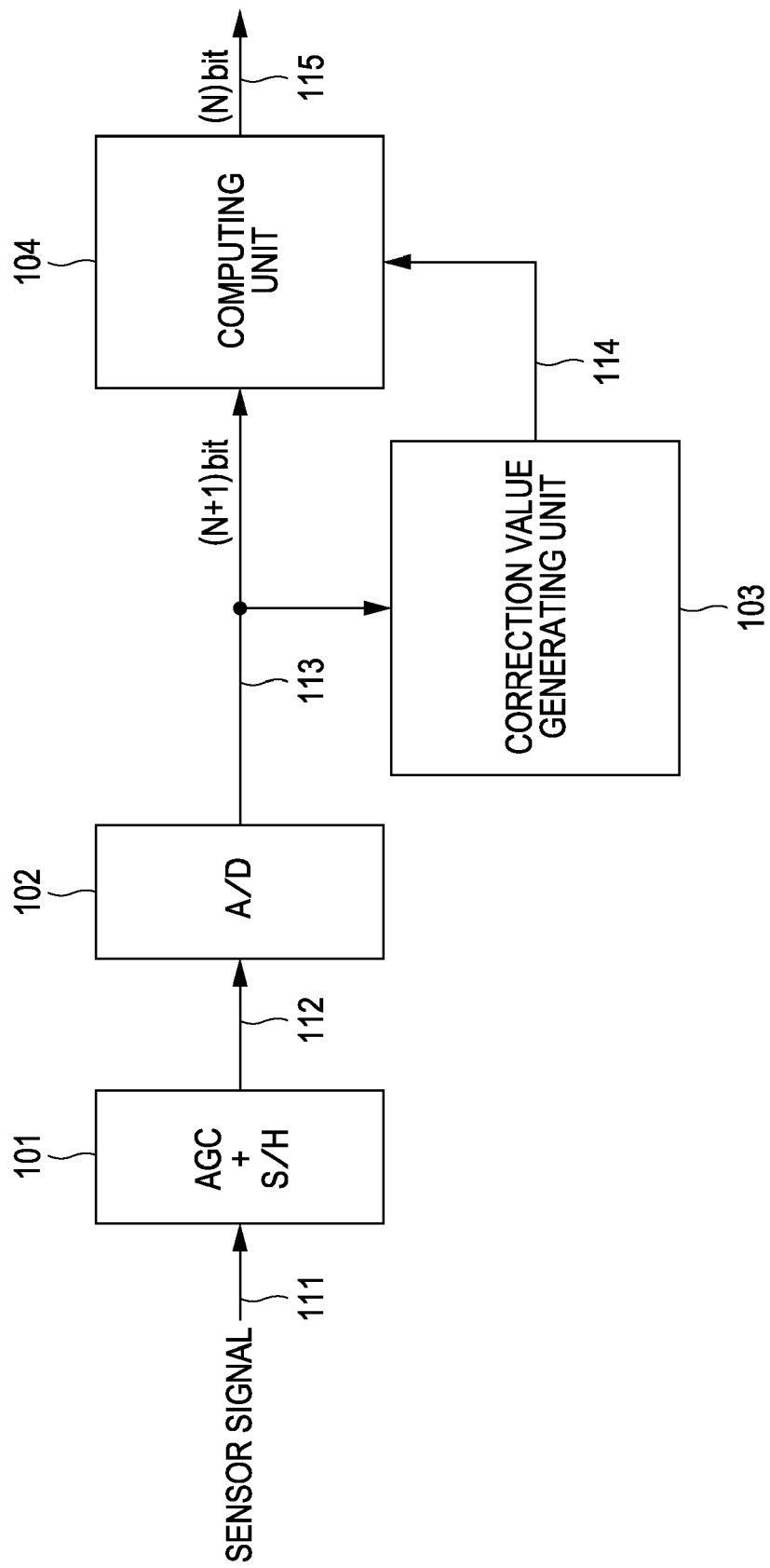
FIG. 3 is a block diagram illustrating a configuration of a clamp correction circuit provided in the solid-state image pickup device of FIG. 1.

FIG. 3 is a block diagram illustrating an exemplary configuration of a digital clamp correction circuit, which is provided for correcting an optical black (OB) signal to a target value in a signal processing circuit of the solid-state image pickup device according to the present embodiment.

Although a CMOS image sensor will be primarily described in the following embodiments, the present invention is similarly applicable to a CCD image sensor.

As illustrated in FIG. 1, a solid-state image pickup device of the present embodiment includes a pixel array unit 20, a vertical scanning circuit 21, a load metal oxide semiconductor (MOS) transistor circuit 24, correlated double sampling (CDS) circuits 25, horizontal selection transistor circuits 26, and a horizontal scanning circuit 22. The pixel array unit 20 includes a plurality of pixels 16 arranged in a matrix and constitutes an image pickup region. The vertical scanning circuit 21 vertically scans each of the pixels 16 in the pixel array unit 20 so as to control a read-out operation for reading out a pixel signal. The load MOS transistor circuit 24 controls vertical signal lines 28 derived from respective pixel columns of the pixel array unit 20. Each CDS circuit 25 captures a pixel signal read out from the corresponding pixel column of the pixel array unit 20 and performs correlated double sampling for removal of noise. Each horizontal selection transistor circuit 26 outputs a pixel signal from the corresponding CDS circuit 25 to a horizontal signal line 27. The horizontal scanning circuit 22 horizontally and sequentially selects the horizontal selection transistor circuits 26 to control output of a pixel signal. The pixel signal output to the horizontal signal line 27 is transmitted through a buffer amplifier 29 to a downstream circuit.

As illustrated in FIG. 2, each pixel 16 includes a photodiode (PD) 1, a transistor (TG) 12, a reset transistor (RST) 14, an amplifier transistor (AMP) 13, and a selection transistor 15. The photodiode 1 photoelectrically converts incident light. The transistor 12 transfers an electrical signal generated by photoelectric conversion to a floating diffusion (FD) unit 3 on the basis of a transfer pulse (ΦTRG). The reset transistor 14 resets the potential of the FD unit 3 to a power supply voltage VDD on the basis of a reset pulse (ΦRST). The amplifier transistor 13 converts variations in the potential of the FD unit 3 into a voltage signal or a current signal. The selection transistor 15 connects the output of the amplifier transistor 13 to the vertical signal line 28 on the basis of a selection signal (ΦSEL).

In the vicinity of each pixel 16, the vertical signal line 28, a power supply line 23, and the like are vertically arranged, while a read-out line 17, a reset line 18, a selection line 19, and the like are horizontally arranged.

Next, a configuration of a digital clamp correction circuit according to the present embodiment will be described with reference to FIG. 3. A digital clamp correction circuit illustrated in FIG. 3 is provided, for example, downstream of the CDS circuits 25 (or downstream of the buffer amplifier 29 in the example of FIG. 1) and supplies an image signal subjected to a clamp correction to a further downstream signal processing circuit (digital signal processor (DSP) described below).

The CDS circuits 25 perform a subtraction between a sample value of a reset level and a sample value of a signal level with respect to a pixel signal output from the pixel array unit 20, and output an image signal from which pixel-specific noise has been removed. Then, a direct current value, such as a black level based on an optical black (OB) area, is added to the output image signal by a downstream automatic gain control (AGC) circuit or the like.

The clamp correction circuit of the present example corrects a black level included in such an image signal, and outputs an optimized image signal to a signal processing circuit (digital signal processor (DSP)) provided downstream.

As illustrated in FIG. 3, the clamp correction circuit of the present example includes an automatic gain control+sample-and-hold (AGC+S/H) circuit 101, an analog-to-digital (A/D) converter 102, a correction value generating unit 103, and a computing unit 104. A digital image signal dealt with by the solid-state image pickup device is N bits of data (i.e., a digital value of $2^n$ at a maximum).

The AGC+S/H circuit 101 performs gain control on an analog image signal (hereinafter referred to as sensor signal) 111 output from an image sensor (e.g., buffer amplifier 29) and holds a signal sampled at predetermined time intervals. In the AGC+S/H circuit 101, a predetermined reference value (which is typically a value (black level) based on an optical black value) is added to a difference signal generated by the CDS circuits 25. Then, the resulting signal is output as a direct current sensor signal 112.

The A/D converter 102 quantizes the analog sensor signal 112 sampled and held by the AGC+S/H circuit 101 and generates a digital image data 113. In this example, quantization is performed at N+1 bits, which are obtained by adding 1 bit (i.e., M=1) for correction to N bits assigned to an image signal at the time of quantization. Then, N+1 bits of digital image data 113 is output from the A/D converter 102. For example, if 10 bits are required for original image data, the image data is quantized at 11 bits.

The correction value generating unit 103 inputs N+1 bits of digital image data output by the A/D converter 102 and calculates a correction value 114 for correcting a reference value (which is a black level in this example) included in the digital image data 113. For example, in the case of a CMOS image sensor, since each pixel column has variations in black level, the correction value generating unit 103 calculates a correction value for correcting such variations or for correcting the black level itself to an appropriate clamp value, and outputs the calculated correction value to the computing unit 104.

The computing unit 104 inputs the correction value 114 generated by the correction value generating unit 103 as well as the N+1 bits of digital image data 113 output from the A/D converter 102. Then, on the basis of the correction value 114, the computing unit 104 performs a computation for correcting a reference value (which is a black level in this example) included in the digital image data 113 and outputs the resulting value as N bits of clamp-corrected image data (output data) 115.

Figure 4:
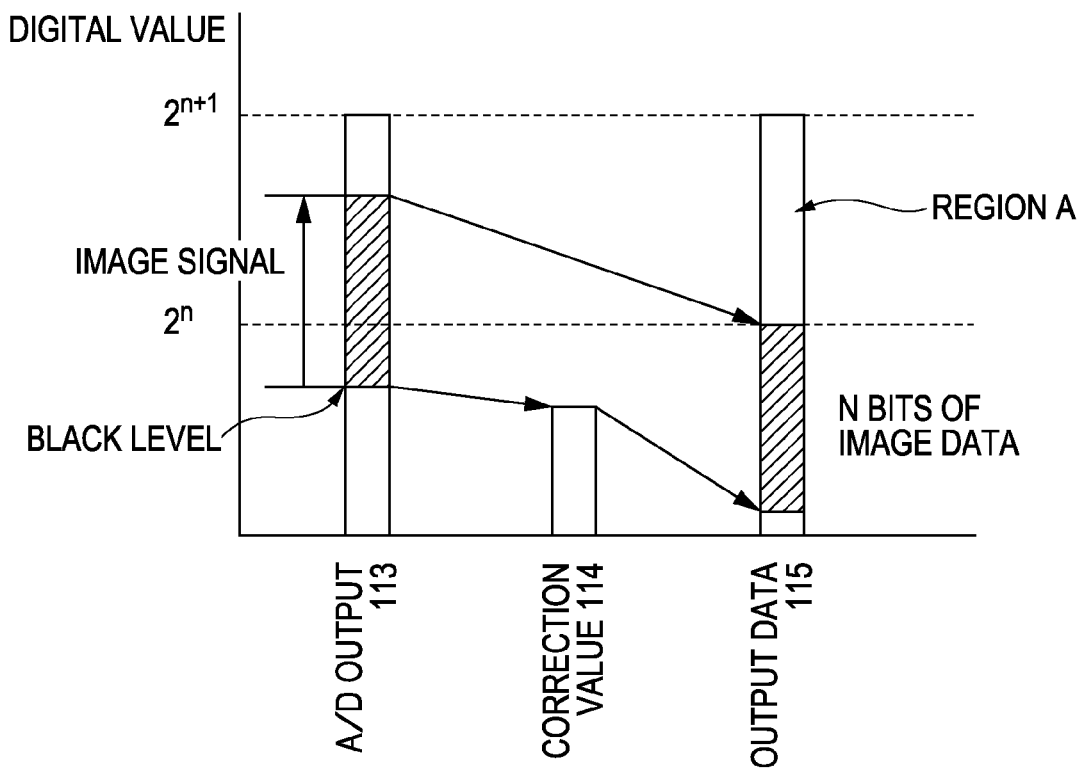
FIG. 4 illustrates a state of an image signal in the clamp correction circuit of FIG. 3.

FIG. 4 illustrates a state of each signal in the clamp correction circuit illustrated in FIG. 3.

First, the A/D converter 102 performs A/D conversion, with 1 bit for correction being added. Thus, the A/D converter 102 generates the N+1 bits ($2^{n+1}$) of digital image data 113. It is sufficient if a value of the black level after quantization is less than $2^n$.

The correction value generating unit 103 calculates, as the correction value 114, a value by considering an offset level of a value obtained by correcting random noise and inter-channel and inter-frame differences using the black level described above. These values are collectively referred to as target values.

Then, the computing unit 104 obtains N bits of output data 115 by subtracting the correction value 114 from the digital image data 113.

As will be clear from FIG. 4, without reducing the dynamic range of an image signal included in the original input, output data is output with the black level clamped. Of this output data, a data portion included in region A exceeding N bits obviously overflows. Therefore, "1" is output for every bit of data in this portion.

By application of the present embodiment, it is possible to achieve an appropriate clamp correction of an optical black area, including a correction of fluctuations and variations in dark current, with a configuration of a digital clamp circuit alone and without wasting a dynamic range.

Moreover, since there is no need to provide an analog feedback correction circuit, it is possible to prevent noise from being applied to an analog signal, which is susceptible to noise, before A/D conversion.

Additionally, since a digital-to-analog (D/A) converter or the like for use in feedback is not necessary, it is possible to reduce a circuit size.

Other operation examples to which the present embodiment is applied will now be described.

As described above, in the present embodiment, if output data exceeds N bits, "1" is output for every bit of overflow data that exceeds N bits. If processing of operation examples 1 through 3 described below is performed on this overflow portion, it is possible to produce a higher quality output.

Figure 5:
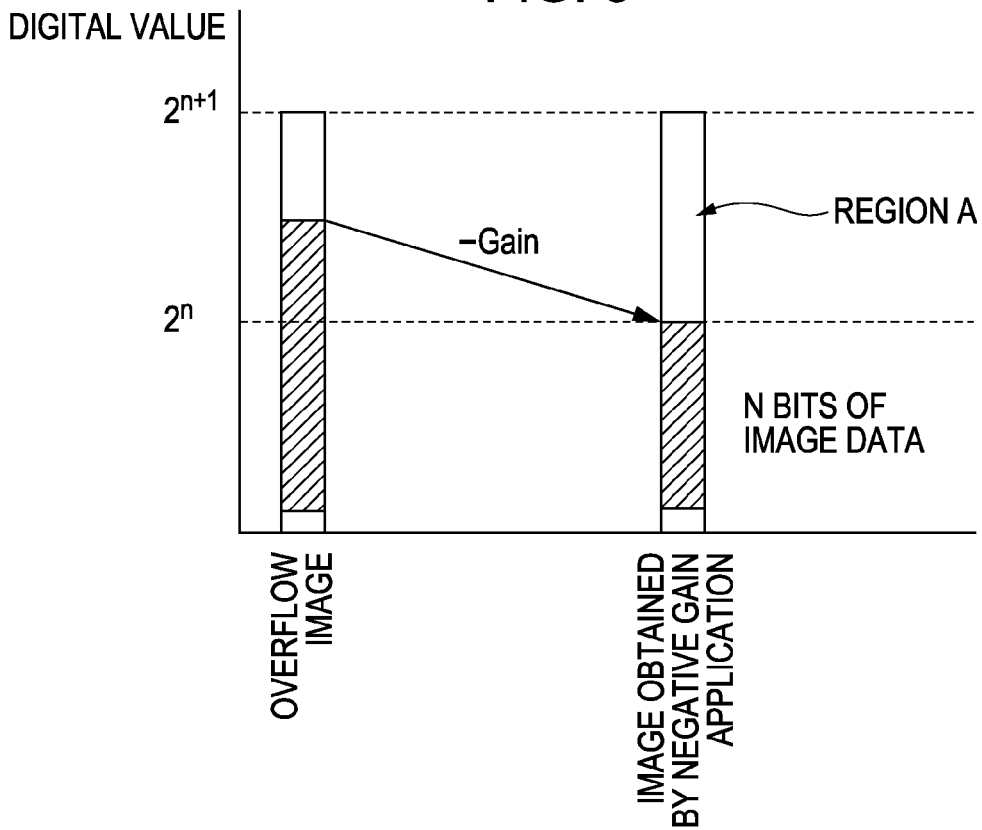
FIG. 5 illustrates a state of an image signal in the clamp correction circuit of FIG. 3 in operation example 1.

FIG. 5 illustrates a state of an image signal in operation example 1.

In operation example 1, a negative gain is digitally applied to a data portion which exceeds N bits and thus is typically treated as an overflow. Thus, this data portion can be treated as normal data.

A digital gain typically means a positive gain. In the present example, however, a negative gain is applied to a usually overexposed image by using 1 bit for correction. This makes it possible to reproduce overflow data as effective data without adversely affecting the dynamic range.

More specifically, for example, a digital gain control circuit is provided downstream of the computing unit 104. Then, after a clamp correction is performed, a negative gain is applied to data that is present in region A of an image signal exceeding N bits, instead of inserting "1" into an overflow portion of the data. Thus, the image data can be contained within N bits.

FIG. 6 illustrates a state of an image signal in operation example 2.

In operation example 2, the resolution of a dark portion of an image is removed on the assumption that the image is bright, overflow data is shifted while the bit resolution of a high brightness portion of the image is maintained, and thus the overflow data is output as effective data.

That is, a brightness level is specified in some way. Then, a low brightness region at or below the specified level is clamped to a clamp-corrected black level and is removed. Thus, data in a high brightness region is shifted, and data present in region A exceeding N bits can be reproduced as effective data.

In this case, a means for controlling a level shifting computation is added to the computing unit 104. A shifting level may be determined from an overflow image signal, or a predetermined fixed level may be used as a shifting level. In other words, a shifting level may be selected from various options according to the state of a subject to be photographed, the use of the system, or the like.

FIG. 7 illustrates a state of an image signal in operation example 3.

In operation example 3, a negative gain is applied only to a high brightness portion that overflows while the bit resolution of a dark region is maintained. Thus, a high dynamic range image having a dynamic range higher than that typically used can be realized. In this case, the level of a high brightness region is specified and then, a negative gain is applied to data at or above this specified level.

Alternatively, the method in which a low brightness region is level-shifted (see FIG. 6) may be combined with the method in which a negative gain is applied to a high brightness region (see FIG. 7). In this case, if the two levels, the level of a low brightness region to be shifted and the level of a high brightness region to which a negative gain is to be applied are specified, and then, a computation is performed, a more optimized high dynamic range image can be realized.

As described above, according to the present embodiment, if a clamp correction circuit is constituted by a digital circuit alone, it is possible to remove an analog feedback circuit, achieve a reduction in circuit size, and prevent an increase in noise caused by the presence of the analog circuit.

Also, if M bits for correction are added at the time of quantization, it is possible to prevent the reduction of the dynamic range caused by digital clamp.

Moreover, since a negative gain can be digitally applied without reducing the dynamic range, it is possible to treat overflow data present in a high brightness region as effective data.

Additionally, even if a low brightness region is clamped while the resolution of a high brightness region is maintained, it is possible to output data without adversely affecting the dynamic range.

Moreover, by applying a negative gain only to a specific portion of a high brightness region, it is possible to prevent data overflow in the high brightness region while maintaining the resolution of a low brightness region.

In the above embodiment, there has been described a clamp correction circuit that performs a clamp correction on an optical black value. However, the present invention is also applicable to other types of clamp correction circuits.

Moreover, although the above description refers to the case where the present invention is applied to a CMOS image sensor, the application of the present invention is not necessarily limited to a CMOS image sensor. The present invention is widely applicable to various types of solid-state image pickup devices that perform a clamp correction and A/D conversion.

The solid-state image pickup device is not limited to one produced by mounting an image sensor on a single chip, but may be configured as a package that includes an image pickup unit with an image sensor mounted thereon, a signal processor, and an optical system that are configured as separate components. The solid-state image pickup device may be further combined with a controller and an operation unit, and used in a camera system or a mobile phone. In other words, in the present invention, a discrete image sensor is referred to as a solid-state image pickup device, while an image sensor combined with other functional components (e.g., a communication module and a display module) is referred to as an image pickup apparatus, both of which are within the scope of the present invention.

The clamp correction circuit illustrated in FIG. 3 may be provided either in the solid-state image pickup device or in the signal processing circuit that is inside the image pickup apparatus and outside the solid-state image pickup device.

An exemplary image pickup apparatus to which the present invention is applied will now be described.

Figure 8:
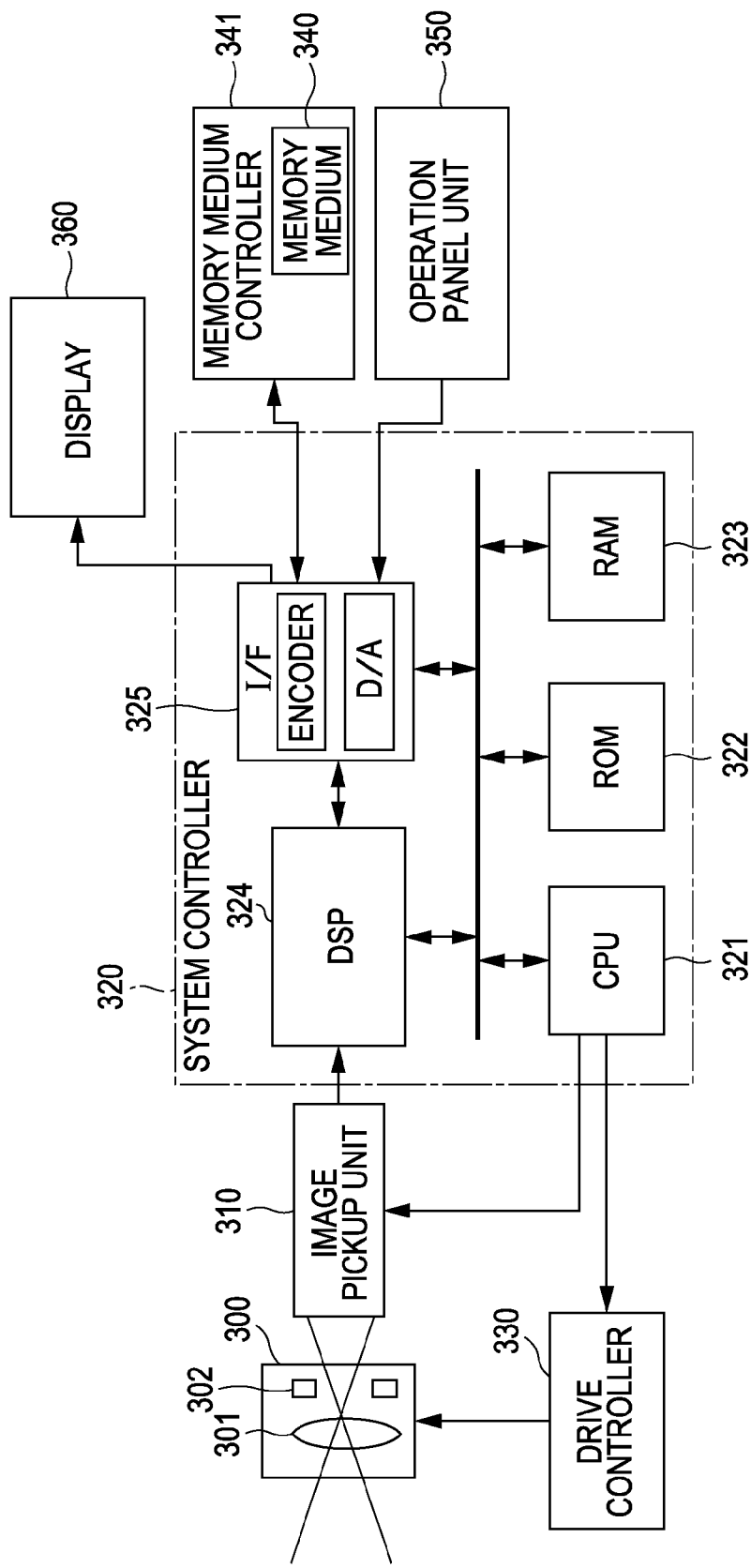
FIG. 8 is a block diagram illustrating an exemplary configuration of an image pickup apparatus in which the solid-state image pickup device of FIG. 1 is provided.

FIG. 8 is a block diagram illustrating an exemplary configuration of a camera apparatus using a CMOS image sensor of the present example.

Referring to FIG. 8, an image pickup unit 310 picks up an image of a subject using, for example, the CMOS image sensor illustrated in FIG. 1, and outputs an image pickup signal to a system controller 320 mounted on a main substrate. That is, the image pickup unit 310 performs, on an output signal from the CMOS image sensor described above, various processing steps, such as automatic gain control (AGC), optical black (OB) clamp, and correlated double sampling (CDS). Then, the clamp correction circuit provided downstream of the image pickup unit 310 generates a clamp-corrected digital image pickup signal, and outputs the generated digital image pickup signal to the system controller 320.

In the present example, the clamp correction circuit is provided immediately downstream of the image pickup unit 310. However, the image pickup unit 310 may transmit an analog image pickup signal to the system controller 320 and then, the clamp correction circuit generates a digital signal. Also, it is to be understood that processing steps in the image pickup unit 310 may be performed in various ways, not in a specific way.

An image pickup optical system 300 includes a zoom lens 301 and an aperture mechanism 302 that are arranged in a lens barrel. The image pickup optical system 300 forms a subject image on a photo-detector of the CMOS image sensor. Under the control of a drive controller 330 based on instructions from the system controller 320, the image pickup optical system 300 mechanically drives each component so as to control autofocus and the like.

The system controller 320 includes a central processing unit (CPU) 321, a read-only memory (ROM) 322, a random-access memory (RAM) 323, a digital signal processor (DSP) 324, and an external interface (I/F) 325.

The CPU 321 uses the ROM 322 and RAM 323 to send instructions to each component of the camera apparatus, thereby controlling the entire system.

The DSP 324 performs various types of signal processing on an image pickup signal from the image pickup unit 310 so as to generate a still image video signal or a moving image video signal (e.g., YUV signal) in a predetermined format.

The external interface 325 includes various encoders and a D/A converter. The external interface 325 sends and receives various control signals and data to and from external elements connected to the system controller 320. In the present example, the external elements are a display 360, a memory medium 340, and an operation panel unit 350.

The display 360 is a compact display device (e.g., liquid crystal panel) included in the camera apparatus and displays a picked-up image. Besides such a built-in compact display device in the camera apparatus, a large external display apparatus can also display a picked-up image based on image data transmitted from the camera apparatus.

The memory medium 340 is capable of storing photographed images as necessary. The memory medium 340 is replaceable, for example, with respect to a memory-medium controller 341. Examples of the memory medium 340 include various types of memory cards and disk media, such as a magnetic disk and an optical disk.

The operation panel unit 350 provides input keys for the user to input various instructions for performing a photographing operation using the camera apparatus. The CPU 321 monitors input signals from the operation panel unit 350 and executes various types of operation control according to the input signals.

By applying the present invention to such a camera apparatus, high dynamic range images of various subjects can be captured. In the configurations described above, it is possible to select, for example, a set size and how to combine unit modules and unit devices which are to serve as system components, on the basis of actual commercialization situations and the like. The image pickup apparatus according to the embodiments of the present invention can be modified variously.

In the solid-state image pickup device and image pickup apparatus according to the embodiments of the present invention, an image to be picked up (i.e., subject image) is not limited to a typical image, such as a human or landscape image, but may be a special and fine image pattern, such as that detected by a counterfeit bill detector or a fingerprint detector. The apparatus configuration in this case is not the same as that of the typical camera apparatus illustrated in FIG. 8, but will further include a special image pickup optical system and a signal processing system, including a pattern analyzer. In this case, it is still possible to fully exert the operational effect of the present invention and realize accurate image detection.

Additionally, the present invention is applicable to remote systems for remote medical care, security monitoring, personal authentication, and the like. In this case, such a remote system may be configured to include a communication module connected to a network as described above.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device comprising:
   a pixel array unit including a plurality of pixels, each pixel having a photoelectric converter;
   a signal conversion circuit configured to convert a pixel signal output from the pixel array unit into an output signal, the output signal being an image signal; and
   a clamp correction circuit configured to generate a predetermined signal from the image signal and correct a clamp level included in the predetermined signal, the predetermined signal being the image signal including an optical black level read from the pixel array unit,
   wherein, the clamp correction circuit includes
   (a) a circuit to generate the predetermined signal from the image signal;
   (b) analog-to-digital conversion means for receiving the predetermined signal from the circuit and performing analog-to-digital conversion of the predetermined signal and generating and outputting N+M bits of digital data at the time of the analog-to-digital conversion, N+M bits being obtained by adding M bits for correction to N bits, the N bits being assigned to the predetermined signal at a time of quantization by the analog-to-digital conversion means;
   (c) correction value generating means for determining a correction value on the basis of the N+M bits of digital data output by the analog-to-digital conversion means and a target value, the correction value used for correcting variations and/or a black level to an appropriate clamp value;
   (d) computing means for performing a correction computation using the N+M bits of digital data output by the analog-to-digital conversion means and the correction value output by the correction value generating means so as to generate lowest N bits of clamp-corrected data, said computing means generating the lowest N bits of clamp-corrected data after performing the correction computation, and
   (e) gain control means for lowering a gain of data in a first specified-level region of the N+M bits of digital data output by the analog-to-digital conversion means; and wherein,
      said computing means includes level shifting control means for level-shifting data in a second specified-level region of the N+M bits of digital data output by the analog-to-digital conversion means, and
      said computing means receives N+M bits of digital data as input directly from the analog-to-digital conversion means, and outputs a resulting value with N bits of clamp corrected data by subtracting the correction value from the digital data.

2. The solid-state image pickup device according to claim 1, wherein M=1.

3. The solid-state image pickup device according to claim 1, wherein gain control is combined with level shifting with respect to each of the first and second specified-level regions.

4. An image pickup apparatus comprising:
   a solid-state image pickup device configured to pick up an image of a subject;
   an image pickup optical system configured to form a subject image on a photo-detector of the solid-state image pickup device;
   a drive controller configured to drive the image pickup optical system;
   a signal processor configured to perform signal processing on an output signal from the solid-state image pickup device so as to generate an image pickup signal;
   a recording unit configured to record the image pickup signal generated by the signal processor;
   an output unit configured to output the image pickup signal generated by the signal processor; and
   an operation unit configured to input various signals for controlling an image pickup operation,
   wherein the solid-state image pickup device includes
   (a) a pixel array unit including a plurality of pixels, each pixel having a photoelectric converter;
   (b) a signal conversion circuit configured to convert a pixel signal output from the pixel array unit into an output signal, the output signal being an image signal; and
   (c) a clamp correction circuit configured to generate a predetermined signal from the image signal and correct a clamp level included in the predetermined signal, the predetermined signal being an image signal including an optical black level read from the pixel array unit,
   wherein the clamp correction circuit includes
   (a) a circuit to generate the predetermined signal from the image signal;
   (b) analog-to-digital conversion means for receiving the predetermined signal from the circuit and performing analog-to-digital conversion of the predetermined signal and generating and outputting N+M bits of digital data at the time of the analog-to-digital conversion, N+M bits being obtained by adding M bits for correction to N bits, the N bits being assigned to the predetermined signal at a time of quantization by the analog-to-digital conversion means (c) correction value generating means for determining a correction value on the basis of the N+M bits of digital data output by the analog-to-digital conversion means and a target value, the correction value used for correcting variations and/or a black level to an appropriate clamp value;

(d) computing means for performing a correction computation using the N+M bits of digital data output by the analog-to-digital conversion means and the correction value output by the correction value generating means so as to generate lowest N bits of clamp-corrected data, said computing means generating the lowest N bits of clamp-corrected data after performing the correction computation, and (e) gain control means for lowering a gain of data in a first specified-level region of the N+M bits of digital data output by the analog-to-digital conversion means;

and wherein, said computing means includes level shifting control means for level-shifting data in a second specified-level region of the N+M bits of digital data output by the analog-to-digital conversion means, and said computing means receives N+M bits of digital data as input directly from said analog-to-digital conversion means, and outputs a resulting value with N bits of clamp corrected data by subtracting the correction value from the digital data.

5. The image pickup apparatus according to claim 4, wherein M=1.

6. The image pickup apparatus according to claim 4, wherein gain control is combined with level shifting with respect to each of the first and second specified-level regions.

* * * * *